(12) United States Patent
Macedo

(10) Patent No.: US 7,129,596 B2
(45) Date of Patent: Oct. 31, 2006

(54) HOVERING WIND TURBINE

(76) Inventor: Aleandro Soares Macedo, 3911 SW. 160th Ave., Apt 202, Miramar, FL (US) 33027

( * ) Notice: Subject to any disclaimer, the term of this patent is extended or adjusted under 35 U.S.C. 154(b) by 87 days.

(21) Appl. No.: 10/904,246

(22) Filed: Oct. 31, 2004

(65) Prior Publication Data
US 2006/0091678 A1 May 4, 2006

Related U.S. Application Data

(60) Provisional application No. 60/481,880, filed on Jan. 10, 2004.

(51) Int. Cl.
F03D 9/00 (2006.01)

(52) U.S. Cl. ............................ 290/55; 290/44; 244/24; 416/248

(58) Field of Classification Search ................ 290/43, 290/44, 54, 55; 415/2, 7; 244/24, 31, 33; 416/248
See application file for complete search history.

(56) References Cited

U.S. PATENT DOCUMENTS

| | | | | |
|---|---|---|---|---|
| 4,073,516 A | * | 2/1978 | Kling | ........................... 290/55 |
| 4,166,596 A | * | 9/1979 | Mouton et al. | ................ 244/30 |
| 4,309,006 A | * | 1/1982 | Biscomb | ....................... 244/33 |
| 4,383,182 A | * | 5/1983 | Bowley | ........................ 290/43 |
| 4,450,364 A | * | 5/1984 | Benoit | .......................... 290/55 |
| 4,491,739 A | | 1/1985 | Watson | ......................... 290/44 |
| 4,659,940 A | | 4/1987 | Shepard | ........................ 290/55 |
| 6,091,161 A | * | 7/2000 | Dehlsen et al. | ............... 290/43 |
| 6,531,788 B1 | * | 3/2003 | Robson | ........................ 290/43 |
| 6,781,254 B1 | | 8/2004 | Roberts | .................. 244/153 R |

* cited by examiner

Primary Examiner—Nicholas Ponomarenko

(57) ABSTRACT

A hovering wind turbine (1) whose blades (2) lie on the surface of an imaginary horizontal cylinder and have their pitch angle changing as a function of the rotational angle, allowing them to gather wind energy mainly in the upwind and downwind sectors of the cylindrical path and to use a fraction of the gathered energy to create lift by deflecting air downwards, mainly in the upper and lower sectors of the cylindrical path. The remainder of the gathered wind energy is used to drive a pair of on board electrical power generators (9), and anchoring tethers (13) carry electrical current to a land of offshore site. The turbine (1) is tied to a blimp (11) that is purposely located in its wind shade and keeps it airborne during periods of light or no wind.

2 Claims, 4 Drawing Sheets

HOVERING WIND TURBINE

CROSS-REFERENCE TO RELATED APPLICATIONS

This application claims the benefit of PPA Ser. No. 60/481,880, filed Jan. 10, 2004 by the present inventor.

BACKGROUND OF INVENTION

1. Field of Invention

This invention relates to tethered wind turbines capable of gathering wind energy while airborne anchored to a land or offshore site.

2. Prior Art

Tethered wind turbines are disclosed in U.S. Pat No. 4,450,364 by Benoit, and in U.S. Pat. No. 4,491,739 by Watson. In both cases the turbine is rigidly mounted around the body of a blimp. Watson's wind turbine relies solely in the buoyancy of the blimp to offset the vertical component of the tether's anchoring force, which can only be accomplished by a large blimp. Benoit proposed installing winglets at the tips of the main rotor blades, and means of controlling their pitch angle for the purpose of generating additional lift for station keeping.

Another prior art device is disclosed in U.S. Pat. No. 4,659,940 by Shepard. He proposes that a number of airfoils be connected to wheel rims to rotate according to a cylindrical path. A kitecraft secured to an anchoring tether supports the cylindrical structure. Shepard did not consider using the airfoils to generate lift. Therefore a kitecraft is required to keep his apparatus afloat. The kitecraft solution would be impractical during periods of very light winds or would put the structure in danger during windstorms.

More recently another tethered wind turbine was disclosed in U.S. Pat. No. 6,781,254 by Roberts. He proposes that on board electrical machines are used to drive a rotor craft like a helicopter up to high altitudes where it tilts to an angle that permits the rotors, while driven by the wind, to support the rotor craft along with its tether and to generate a surplus of electrical power that is transmitted to the ground. The device uses a winch at ground level for winding and unwinding the tether to be brought down during long periods of light wind; therefore it requires a landing field, which makes its operation, especially in offshore sites, more challenging. Due to safety issues, a complex and very reliable control system is needed for its autonomous operation. There are also concerns about safety of air traffic since the anchoring tether will not be visible to air pilots or radars.

BACKGROUND OF INVENTION—OBJECTS AND ADVANTAGES

An object of the present invention is to employ hovering wind turbines to gather wind energy.

An object is to use lighter-than-air balloons to keep the tethered wind turbines airborne during periods of light or no wind.

An object is to protect the lighter-than-air balloons from excessive wind forces by positioning them downwind to the wind turbines, where the wind speed is attenuated due to the fact that the wind turbine operates by extracting kinetic energy from the air flow.

An object is to have an array of the disclosed wind turbines anchored to a land or offshore site to generate large amounts of energy.

An object is to gather energy from stronger winds available at higher altitudes.

An advantage is that it requires much smaller supporting blimps than prior art.

An advantage is that it does not require a supporting kitecraft as in prior art.

An advantage is that it does not require a tall tower to support the turbine.

An advantage is that it is a better alternative for offshore wind power generation, since a large array of turbines con share a single offshore anchoring site.

An advantage is its potential to reduce the costs of deep-water offshore wind power generation, since the turbines in a large array con share the higher costs of a deep-water anchoring site.

An advantage is its potential to generate significantly less visual pollution when deployed further away offshore.

An advantage is that the individual wind turbine could have moderate sizes that are suitable for mass production, which would lead to lower cost per kilowatt-hour.

An advantage is that it is possible to grow the array by adding more rows of hovering wind turbines. This way, increasing wind power production can be made by adding more rows of turbines to existing sites and not necessarily by building new sites.

Further objects and advantages of my invention will become clear from the description of the drawings.

SUMMARY OF INVENTION

A tethered wind turbine, whose blades move in a closed cylindrical path, and have their pitch angle changing as a function of the rotational angle in order to gather wind energy mainly in the upwind and downwind sectors of the cylindrical path, and to deflect air downwards mainly in the upper and lower sectors of the cylindrical path to generate lift for station keeping. A lighter-than-air balloon is used to offset wind turbine weight, and so to keep it afloat when the wind is not strong enough for flying the wind turbine. An array of these hovering wind turbines can be used to generate large amounts of energy.

DRAWINGS—FIGURES

Figure 1:
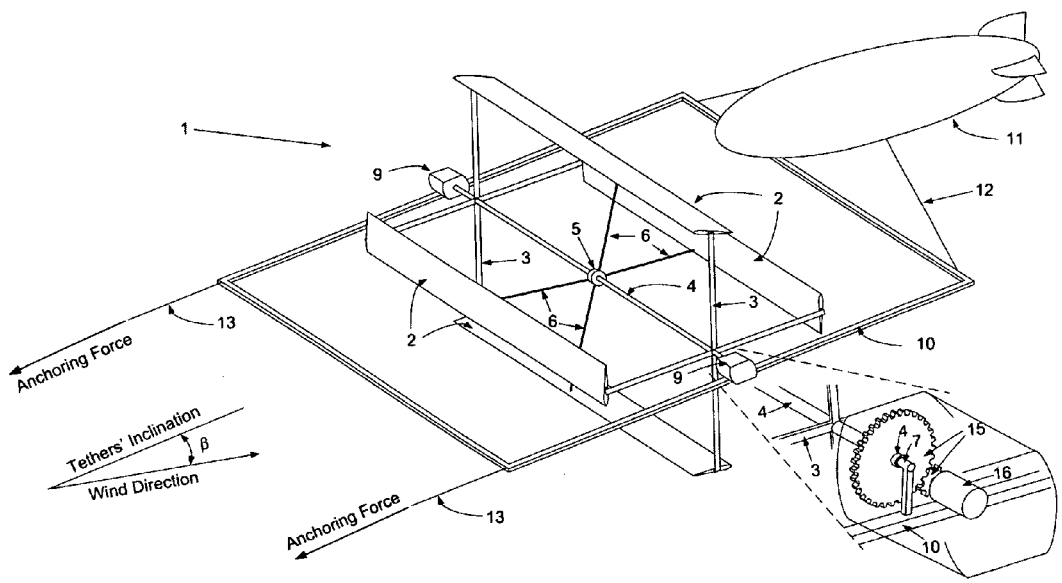
FIG. 1 shows a view in perspective of a four-bladed hovering wind turbine. It also shows inside details of the power generators, which are the means of converting rotational mechanical energy from the wind turbine into electrical power.

DRAWINGS—REFERENCE NUMERALS 1. hovering wind turbine
2. turbine blade
3. blade arm
4. turbine axle
5. crank handle drum
6. crank arm 7. crank handle
8. axle bearing
9. power generator (contains gear set and electrical generator)
10. turbine frame
11. blimp
12. blimp mooring rope
13. anchoring tether
14. anchoring pole
15. gear set
16. electrical generator
17. articulated joint bearing

DETAILED DESCRIPTION—PREFERRED EMBODIMENT

The preferred embodiment of the hovering wind turbine 1 of the present invention is illustrated in FIG. 1.

Articulated joints (not shown) connect the two ends of blade 2 to blade arms 3. The other ends of arms 3 are connected to turbine axle 4.

Figure 2:
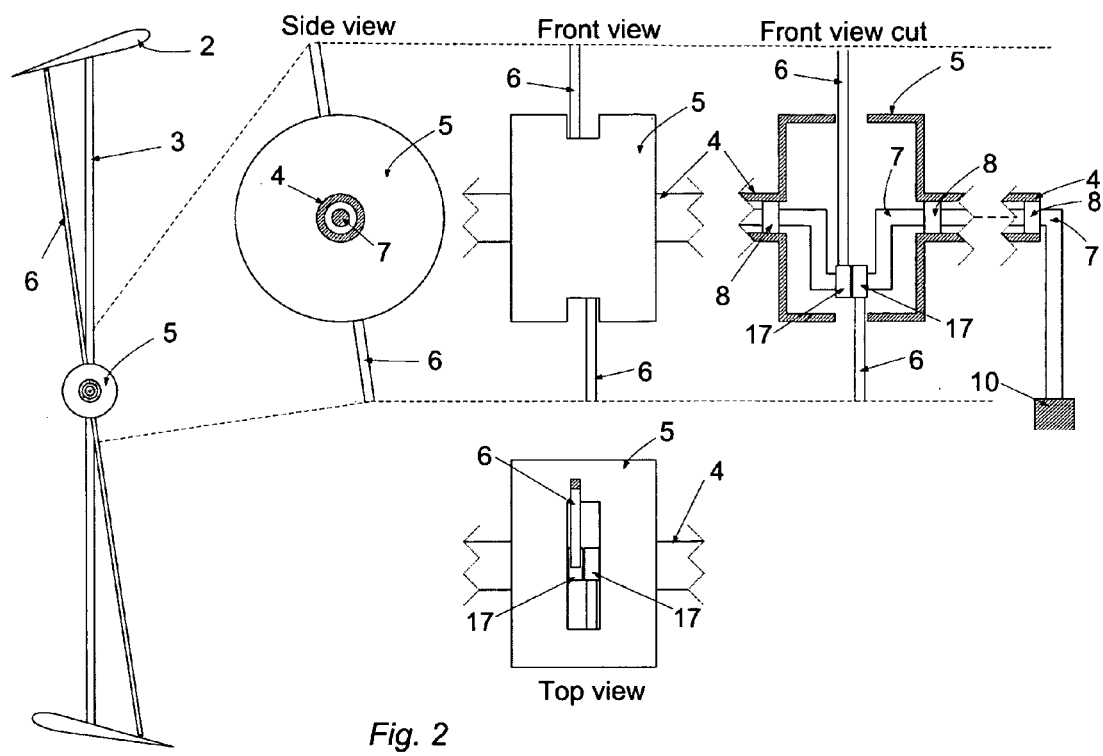
FIG. 2 shows details of the crank handle drum of a two-bladed hovering wind turbine. It is used to change the pitch angle of the blades as a function of the rotational angle of the turbine.

A drum 5 is coaxial with axle 4 and located at the center of axle 4. It rigidly holds together the two half parts of the hollow axle 4, and houses a crank handle 7. Drum 5 and hollow axle 4, supported by axle bearings 8, rotates around crank handle 7, which is connected to turbine frame 10 as illustrated in FIG. 2.

There is one radial opening in drum 5 for each crank arm 6. It allows one extremity of crank arm 6 to reach the interior or drum 5, where it connects to crank handle 5 via an articulated joint bearing 17, as illustrated in FIG. 2. The other extremity of crank arm 6 is connected to an articulated joint (not shown) located in the rear section of blade 2. This arrangement allows crank arms 6 to rotate along with axle 4, while crank handle 7 is kept stationary inside drum 5. This relative rotational movement of crank handle 7 in relation to crank arms 6 is converted into backward and forward radial movement of crank arm 6, which causes the extremity of arm 6 that is connected to the rear section of blade 2 to follow an elliptical orbital path around turbine axle 4. The other two articulated joints of blade 2 follow circular orbits around axle 4, since these are kept at a constant distance from axle 4, which is equal to the length of a blade arm 3. Therefore, with the lateral articulated joints of blade 2 following a circular path, and its rear-section articulated joint following an elliptical path, the desired effect is obtained in the form of cyclical changes in the blade's pitch angle as it travels in the closed cylindrical path.

The turbine axle 4 drives a pair of power generators 9. Generator's 9 inside details are illustrated in FIG. 1. It comprises a gear set 15 and an electrical generator 16. Electrical generator 16 converts the rotational mechanical energy of the wind turbine into electrical energy, which is then transferred to an anchoring site by means of power cables that are components of anchoring tethers 13.

Blimp 11 airlifts turbine frame 10 by means of mooring ropes 12. Blimp 11 is preferably located downwind in relation to the wind turbine, in a region where the wind speed is attenuated when the wind turbine is operational.

Blimp 11 airlifts turbine frame 10 by means of mooring ropes 12. Blimp 111 is purposely located it in the wind shade created by the turbine.

Anchoring tethers 13 anchor turbine frame 10 and serve also for the following auxiliary purposes. Since blimp's envelopes can leak small amounts of gas, a constant supply of a lighter than air gas, e.g. hydrogen or helium, is made available through a narrow tube (not shown), which is one of the components of tether 13. Electrical current generated by electrical generators 16 is carried down to the anchoring site through an electrical power cable (not shown), which is another component of tether 13. If deployed at higher altitudes, the turbine may be required to be equipped with air traffic signaling lights (not shown). In this case an auxiliary electrical power cable (not shown) is also used in the making of tether 13 for the purpose of powering the turbine's signaling lights.

A remotely controlled mooring rope launcher (not shown) can be mounted on frame 10 for the purpose of launching a mooring rope (not shown), which is used to pull the structure down to the ground or, in the case of offshore application, to the deck of a vessel (not shown) when turbine 1 needs to receive maintenance work.

Figure 3:
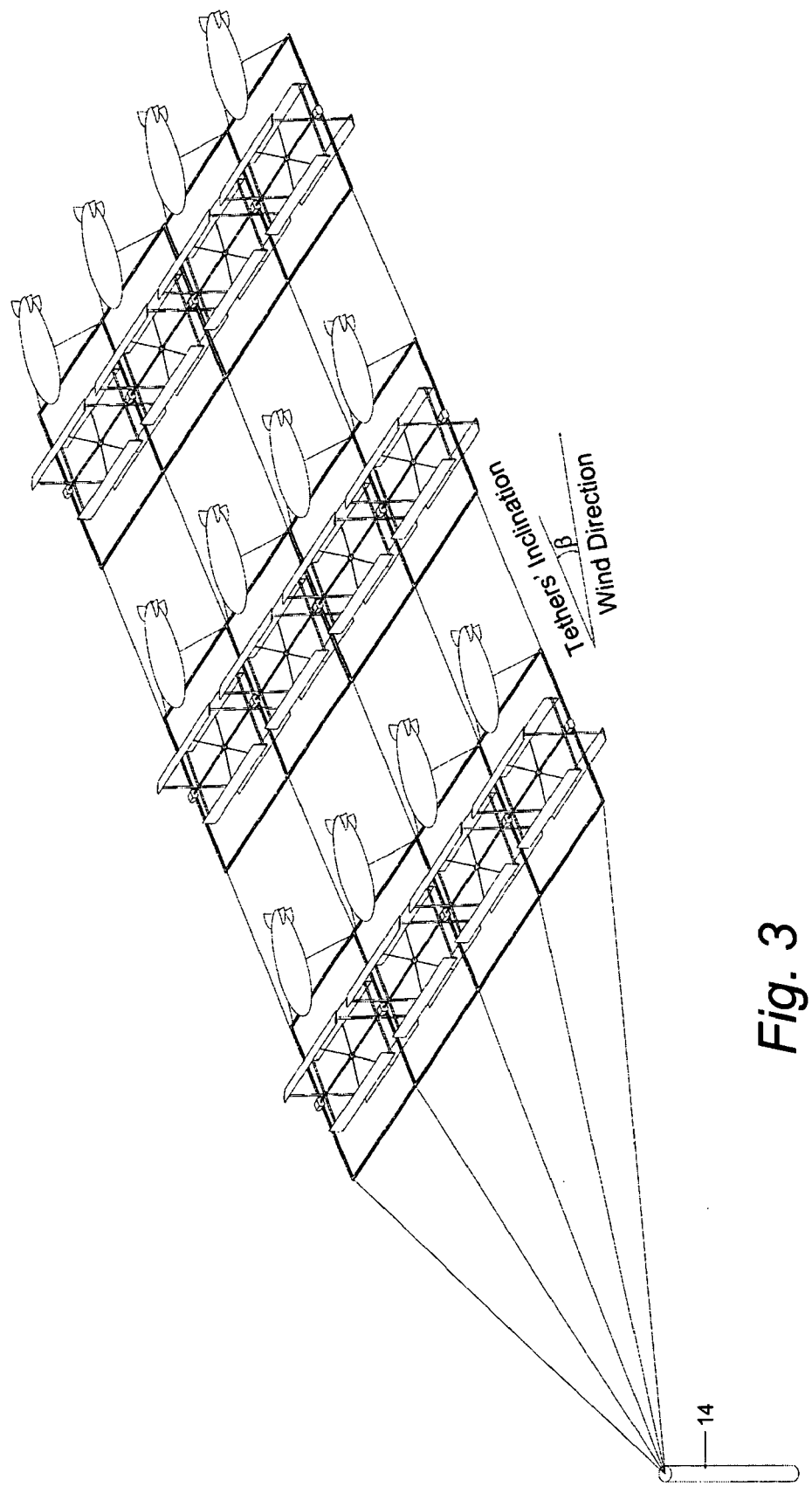
FIG. 3 is a view in perspective of an array of hovering wind turbines.

FIG. 3 shows an array of the hovering wind turbines anchored to a pole 14.

A second embodiment (not shown) employs anchoring driveshafts to anchor the hovering wind turbine and to transfer to the anchoring site the energy gathered by it in the form of torque, where it could be converted into electrical power by a grounded electrical generator.

Yet, a third embodiment (not shown) employs on board air compressors to transfer the energy gathered by the hovering wind turbine 1 in the form of compressed air to the anchoring site, where it could be converted into electrical power by a gas turbine (not shown).

OPERATION

Figure 4:
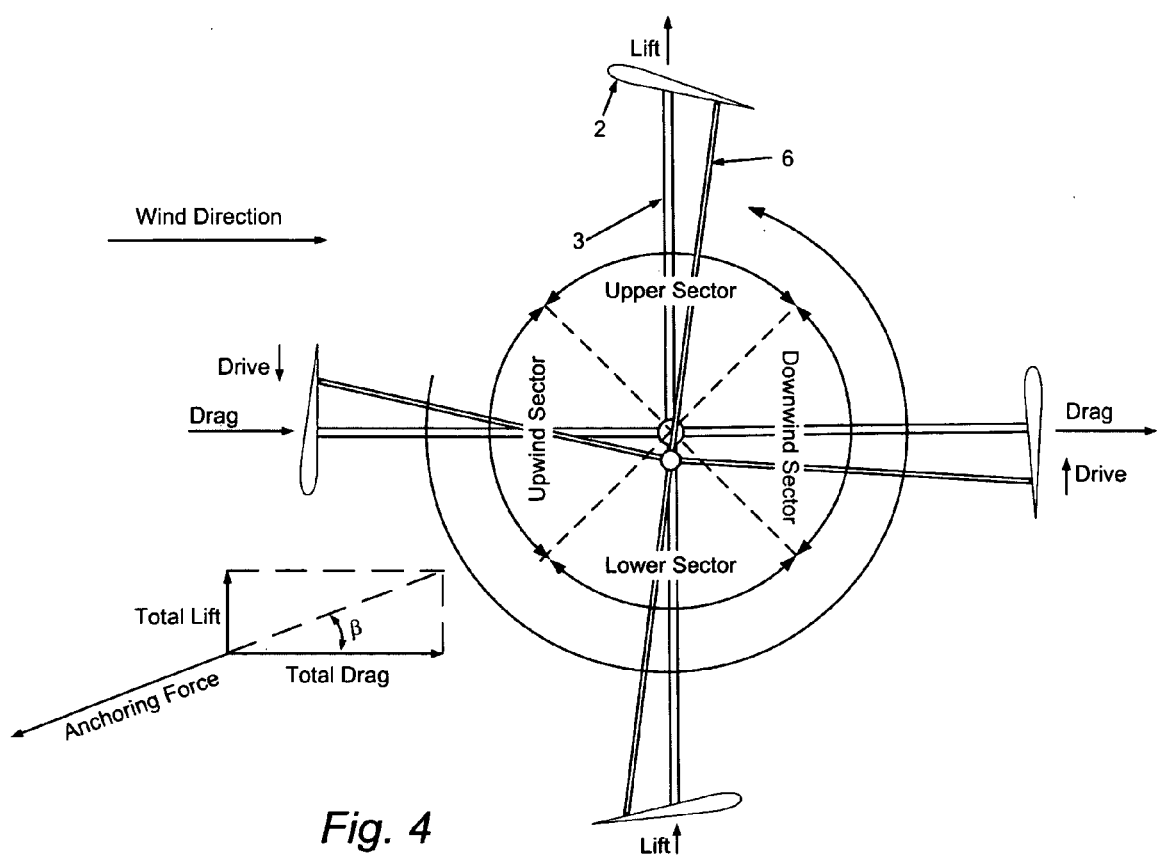
FIG. 4 shows a lateral view of a four-bladed hovering wind turbine and illustrates how the lift, drag and drive component forces are created.

FIG. 4 shows a lateral view of a four-bladed hovering wind turbine. In this embodiment, when blade 2 is in the upper sector and moving upwind with a positive pitch, it creates mainly a lift component force. When blade 2 is in the lower sector moving downwind, and also with a positive pitch, it creates a lift component force as well, since it is assumed that the wind turbine operates with blade speed higher than the wind speed. Therefore the blades encounter an apparent frontal wind when moving downwind, which is the resultant of the blade speed minus the wind speed. When blade 2 is in the upwind or in the downwind sectors of the cylindrical path it creates mainly drag and drive component forces. The resulting drive force causes the turbine to rotate while the anchoring force of tethers 13 counterbalances the resulting total drag and total lift. This way, lift and drag forces offset the respective vertical and horizontal components of the anchoring force.

Blimp 11 is used to offset turbine 1 weight, so it is capable of staying afloat even at times when the wind is not strong enough. On the other hand, under stronger wind regimes, blimp 11 could be subjected to mechanical stresses, which over time could damage its envelope. It is observed that an operating wind turbine creates a downwind region where the wind speed is highly attenuated. Therefore it is advantageous to locate blimp 11 in this downwind region of attenuated wind speeds.

CONCLUSIONS, RAMIFICATIONS AND SCOPE

Thus this invention proposes a mechanism to collect large amounts of wind energy by anchoring an array of hovering wind turbines to a single site. Small or midsize turbines are preferable, since they would not be subject to very large loads and could be made light enough to be lifted by a blimp having only a fraction of their sizes. Also in favor of having small to midsize turbines is the fact that economies of scale could make a large array of smaller turbines more cost effective than a single large tower mounted turbine.

The commercial development of this invention could benefit from electric power train technology being developed to drive electric and hybrid cars. Car manufactures and their suppliers are in a race to develop electric engines with the best power to weight ratio. There are already off-the-shelf electric machines weighting less than 1 kg per kilowatt, and these machines could be easily converted to function as electric generators. These power generators are rated in the range of 30 to 50 kilowatt, which is suitable for a midsize wind turbine. Economies of scale created in the auto industry will drive the cost of high power to weight ratio electric generators quickly down, and could greatly benefit the commercial development of the disclosed invention.

The power output of a hovering wind turbine array is proportional to the effective area of each turbine and to the number of turbines in the array. The power output calculation con be obtained with the following generic equation.

$$P = C_e * r_0 * A_e * W^3$$

Where $C_e$ is a constant associated with the efficiency, $r_o$ is the air density, $A_e$ is the effective area of the turbine and W is the wind velocity. An estimate of the power generation capacity of the invention can be obtained from the equation above. For example, an array of 10×10 hovering wind turbines can generate dose to 3 MW, assuming a typical $C_e$ of 0.15, turbine's area $A_e$ equal to 100 square meter (10 meter wide by 10 meter tall), wind velocity equal to 12 m/s, $r_o$ equal to 1.25 kg/m³, and assuming that about 10% of the gathered wind power is used to generate lift.

There are tower mounted wind turbines with about 3 MW power output available in the market. However these are very expensive, not only the turbine itself but also all the construction work required to erect it inland or offshore. Economies of scale will allow for mass-produced small or midsize hovering wind turbines to generate power at a fraction of the cost of power generated by large tower mounted turbines. Besides, the price of a tower for a large wind turbine is generally around 20 percent of the total price of the turbine, and this cost would not exist in the case of an array of hovering wind turbines.

Another important advantage of hovering wind turbines over very large tower mounted turbines will be in their transportation from the factory to the installation site, since there would be no massive component to transport. Therefore its parts could be transported in regular shipping containers at a low cost. It would also greatly simplify site construction work, since it does not require erecting a very tall tower.

But the most important advantage over tower mounted turbines is that it makes it possible to extend the array length by adding more rows of turbines, therefore reaching higher altitudes where there is more wind energy to harvest. Accomplishing this with tower-mounted turbines is a challenging engineering problem, and may not be viable from an economic point of view.

A potential application for this invention is in the production of hydrogen fuel. Hydrogen can be produced through electrolysis, where water molecules are broken into hydrogen and oxygen molecules by an electrical current. It is expected that hydrogen will become an important fuel source due to its clean combustion and due to advances being made in the area of hydrogen driven fuel cells.

It is particularly attractive applying the invention offshore in deep waters. Multiple large arrays of the invention con be anchored to offshore sites to generate multi-megawatts, and hydrogen can be locally produced and collected in a platform through a network of underwater pipes. The platform can then be regularly visited by hydrogen transporting vessels to upload its hydrogen cargo and ship it to large power consuming centers. This activity could offer a natural way for oil companies that are currently exploring offshore oil reserves to transition to the hydrogen-based economy. Those areas over international seawaters that are rich in wind energy could be explored for the production of hydrogen, and could become an important source of energy for many industrialized nations that cannot rely on a regular supply of other sources of cheap and dean energy.

While preferred embodiments of the invention have been shown and described, it will be apparent to those skilled in the art that various modifications may be made in these embodiments without departing from the scope of the invention. Therefore, it is intended that the invention not be limited to the particular embodiments disclosed but that the scope of the invention be defined by the following claims.

What is claimed is:

1. A hovering wind turbine station, comprising:
a wind turbine with a plurality of blades,
a generator driven by said turbine for producing of an electrical energy,
a means for holding said blades on a surface of an imaginary horizontal circular cylinder and rotating them about a horizontal axis of said cylinder in a closed cylindrical path,
a means for controlling a pitch angle of said blades by a crankshaft means as a function of the rotational angle to provide said blades with the dual capability of gathering wind energy and generating airlift for the station, where
said pitch angle and a position of the blades gather wind energy in the upwind and downwind sectors of the cylindrical path and generate lift in the upper and lower sectors of the cylindrical path,
a lighter-than-air-balloon to support said station uplifted in the air,
a means for anchoring said station to a land site,
a means for transferring the generated electrical energy to the land site.

2. A hovering wind turbine station, as in claim 1, interconnected into an assembly of a plurality of said wind turbine stations for production of an electrical energy as a combined system.

* * * * *